(12) United States Patent
Errico et al.

(10) Patent No.: US 9,768,594 B2
(45) Date of Patent: Sep. 19, 2017

(54) ACTUATING DEVICE FOR AN ELECTRIC SWITCHGEAR

(71) Applicant: ABB Technology AG, Zurich (CH)

(72) Inventors: Ennio Errico, Fornovo San Giovanni (IT); Matteo Papetti, Cerro al Lambro (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/712,517

(22) Filed: May 14, 2015

(65) Prior Publication Data

US 2015/0249323 A1    Sep. 3, 2015

Related U.S. Application Data

(63) Continuation of application No. PCT/EP2013/071621, filed on Oct. 16, 2013.

(30) Foreign Application Priority Data

Nov. 14, 2012  (EP) .................................... 12192637

(51) Int. Cl.
*H02B 5/00* (2006.01)
*H02B 5/06* (2006.01)

(52) U.S. Cl.
CPC .................. *H02B 5/00* (2013.01); *H02B 5/06* (2013.01)

(58) Field of Classification Search
CPC ... H02B 5/00; H02B 5/06; H02B 1/52; H02B 13/035; H02B 13/00; H02B 1/04;
(Continued)

(56) References Cited

U.S. PATENT DOCUMENTS

| 2,238,636 A | 4/1941 | Harold |
|---|---|---|
| 4,016,382 A | 4/1977 | Roth |

(Continued)

FOREIGN PATENT DOCUMENTS

| DE | 20 2010 016682 U1 | 4/2011 |
|---|---|---|
| EP | 1 571 334 A1 | 9/2005 |
| WO | WO 00/17975 A1 | 3/2000 |

OTHER PUBLICATIONS

International Search Report (PCT/ISA/210) mailed on Nov. 20, 2013, by the European Patent Office as the International Searching Authority for International Application No. PCT/EP2013/071621.

(Continued)

*Primary Examiner* — Renee S Luebke
*Assistant Examiner* — William Bolton
(74) *Attorney, Agent, or Firm* — Taft Stettinius & Hollister LLP

(57) ABSTRACT

An actuating device for an electric switchgear of the type having one or more bushings connected to a casing. The actuating device can include a gear mechanism which is suitable to be mounted at and outside the zone where a bushing is connected to the casing, and which includes a plurality of gears operatively interconnected to each other and arranged to move a bushing between a first service position and a second transport position wherein it is lowered towards the casing from the first service position. A connection can be arranged to keep the bushing operatively coupled to the casing while moving it between the first and second positions.

22 Claims, 16 Drawing Sheets

(58) Field of Classification Search
CPC .. H01H 1/00; H01H 3/00; H01H 9/00; H01H 50/00
USPC ........ 218/154, 153, 139, 140, 97; 200/148 R
See application file for complete search history.

(56) References Cited

U.S. PATENT DOCUMENTS

| | | | |
|---|---|---|---|
| 4,535,253 | A | 8/1985 | Ootsuka et al. |
| 5,796,060 | A | 8/1998 | Fuchsle et al. |
| 7,458,776 | B2 * | 12/2008 | LLorente Gonzalez ............ F03D 7/0204 416/9 |
| 2005/0196280 | A1 | 9/2005 | Gonzalez et al. |
| 2013/0239722 | A1 | 9/2013 | Voellner et al. |

OTHER PUBLICATIONS

Written Opinion (PCT/ISA/237) mailed on Nov. 20, 2013, by the European Patent Office as the International Searching Authority for International Application No. PCT/EP2013/071621.

* cited by examiner

ACTUATING DEVICE FOR AN ELECTRIC SWITCHGEAR

RELATED APPLICATION

This application claims priority as a continuation application under 35 U.S.C. §120 to PCT/EP2013/071621, which was filed as an International Application on Oct. 16, 2013, designating the U.S., and which claims priority to European Application 12192637.2 filed in Europe on Nov. 14, 2012. The entire contents of these applications are hereby incorporated by reference in their entireties.

FIELD

The present disclosure relates to an actuating device suitable to be connected to an electric switchgear for high voltage applications, such as for applications with nominal voltages above 1 kV; the present disclosure also relates to an actuating device suitable to move (e.g. to rotate), a bushing of the associated switchgear relative to the casing to which it is connected.

BACKGROUND INFORMATION

It is known in the art that along the path of power grids there are provided various electrical devices, such as fault-protecting devices, monitoring devices et cetera. As a whole, such electrical devices, which can be grouped into substations, are devoted to ensure that electric power is transmitted and distributed properly and correctly to loads and users, preventing the occurrence—or intervening in case—of electrical malfunctioning or faults.

To this end, in recent years some compact and multifunctional switchgear have been designed, which integrate in a unique apparatus and are able to perform several electrical functions; some examples of such kind of multifunctional switchgear are disclosed in U.S. Pat. No. 5,796,060 and European Patent No. EP1121739.

Such devices can include a main casing which houses one or more electrical devices; e.g., a disconnector, a circuit breaker, current and/or voltage transformers, et cetera.

On top of the casing there are mounted one or more bushings each containing a corresponding electric conductor so as to realize an input or output connection of the switchgear with the outside; e.g., with a power line and/or with other electrical components of the substation.

One issue of these devices resides in the fact that, once assembled in the manufacturing plant, their overall size (e.g., their height), may exceed the maximum standards for shipping (e.g., road shipping).

Indeed, it is often necessary to ship poles of the device separately, or to adopt shipping configurations rather complicated, or even to disassemble parts, such as the bushings from the casing, and to reassemble them at the installation site. This latter solution clearly entails additional issues, for instance re-conditioning and/or re-testing the equipment, especially if the switchgear contains an insulating gas, or if air, dust, et cetera, penetrate inside it.

SUMMARY

An actuating device is disclosed which is configured for connection to an associated electric switchgear of the type having a casing housing one or more electrical devices and at least one bushing which is connected to the casing and houses a conductor suitable to allow the electrical connection in input to or output from the switchgear, the actuating device comprising: a gear mechanism configured to be mounted at and outside a zone where the at least one bushing is to be connected to the casing, wherein the gear mechanism includes a plurality of gear means which are operatively interconnected to each other and are arranged to move said at least one bushing between a first service position and a second transport position wherein it is lowered towards the casing from said first service position; and connection means which are configured and arranged to keep the at least one bushing operatively coupled to said casing while moving it between said first and second positions.

BRIEF DESCRIPTION OF THE DRAWINGS

Further characteristics and advantages will become apparent from the description of some preferred but not exclusive exemplary embodiments of an actuating device according to the present disclosure, illustrated only by way of non-limitative examples with the accompanying drawings, wherein.

DETAILED DESCRIPTION

Figure 1:
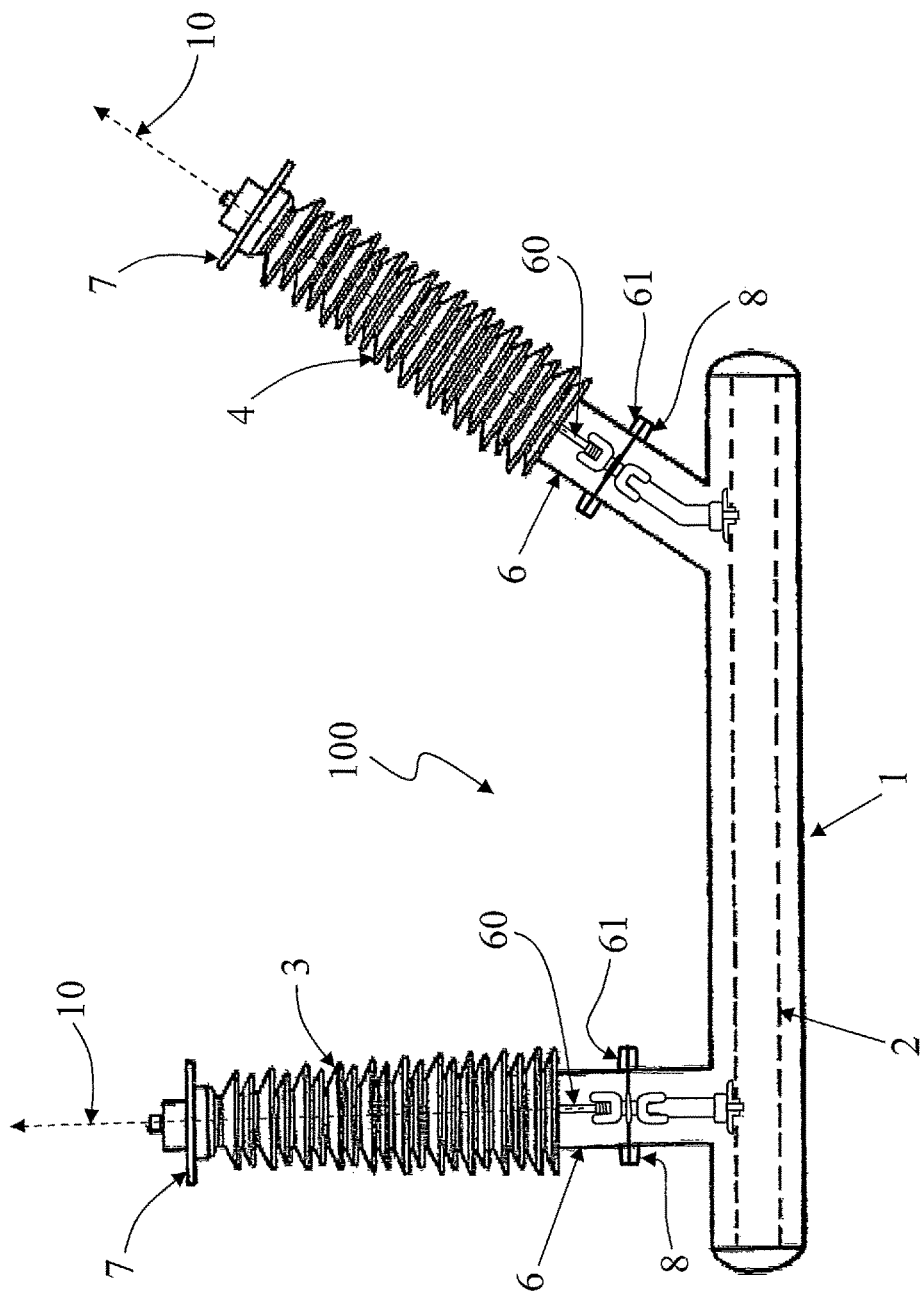
FIG. 1 is a side view schematically illustrating an example of an electric switchgear.

The present disclosure can address the aforementioned issues by providing an actuating device suitable to be connected to an associated electric switchgear of the type having a casing housing one or more electrical devices and at least one bushing which is connected to the casing and houses a conductor suitable to allow the electrical connection in input to or output from the switchgear. An exemplary actuating device of the present disclosure can include:

a gear mechanism which is suitable to be mounted at and outside the zone where said at least one bushing is connected to the casing, wherein the gear mechanism includes a plurality of gear means which are operatively interconnected to each other and are arranged to move the at least one bushing between a first service position and a second transport position wherein it is lowered towards said casing from the first service position; and connection means which are arranged to keep the at least one bushing operatively coupled to the casing while moving it between the first and second positions.

It should be noted that in the detailed description that follows, identical or similar components, either from a structural and/or functional point of view, have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further, when the term "adapted" or "arranged" or "configured" or "shaped" is used herein while referring to any component as a whole, or to any part of a component, or to a whole combinations of components, or even to any part of a combination of components, it has to be understood that it means and encompasses the structure, and/or configuration and/or shape and/or positioning of the related component or part thereof, or combinations of components or part thereof, such term refers to.

The exemplary actuating device of the present disclosure is particularly suitable to be used in a gas-insulated or hybrid switchgear, e.g. of the type marketed by the ABB® group under the commercial name of PASS, and it will be described by making reference to such a type of switchgear without intending in any way to limit its possible scope of applications also to different types of electrical switchgear or devices.

An exemplary actuating device according to the present disclosure is globally indicated with the reference number 200 in the relevant attached figures; such actuating device 200 is suitable to be connected to an associated electric switchgear of the type having a casing housing one or more electrical devices and at least one bushing which is connected to the casing and houses a conductor suitable to allow the electrical connection in input to or output from the switchgear itself.

FIG. 1 schematically represents an electric switchgear 100 of this type which includes a casing 1 devised to house one or more electrical devices 2, e.g., current switching devices, such as circuit breakers or disconnectors, monitoring devices, for instance instruments transformers, et cetera.

Figure 2:
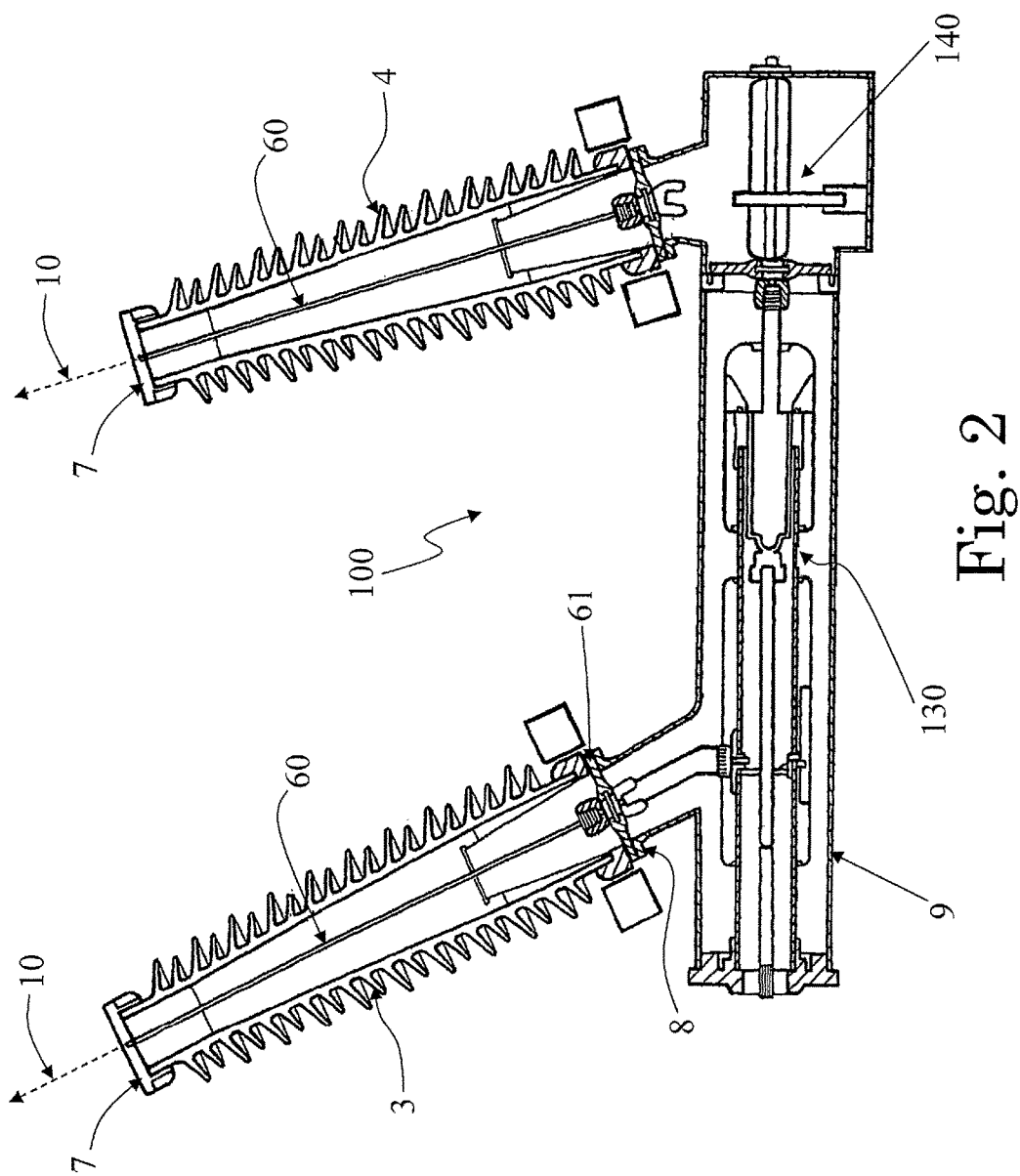
FIG. 2 is a side view showing an example of an electric switchgear cut in order to show some exemplary internal electrical devices.

The casing 1 can have whatever suitable shape other than that illustrated in FIG. 1; for instance, according to the example illustrated in FIG. 2, the casing 1 includes a main portion 9 which can be partially or totally filled with an electric insulating gas and inside which there are positioned, a circuit breaker 130 and a disconnector/earthing unit 140.

Clearly, the casing 1 can be formed by just one single piece of whatever shape, e.g. the main portion 9 as in the example of FIG. 2, or it may include two or more pieces connected to each other; in addition, other components and electrical devices can be positioned inside the casing 1 according to various applications.

For instance, in the exemplary embodiments illustrated in FIGS. 3-8, the casing 1 includes the main portion 9 and some additional pieces 150 which are mechanically connected to the main portion 9 at different positions and are shaped to house corresponding electrical devices, e.g. instrument transformers, such as current or voltage transformers.

The shape, positioning, functioning, and mutual connection and/or inter-operation of the various electrical devices are not relevant for the understanding of the present disclosure and in any case are well known or readily available to those skilled in the art and therefore will not be described herein in details.

Figure 3:
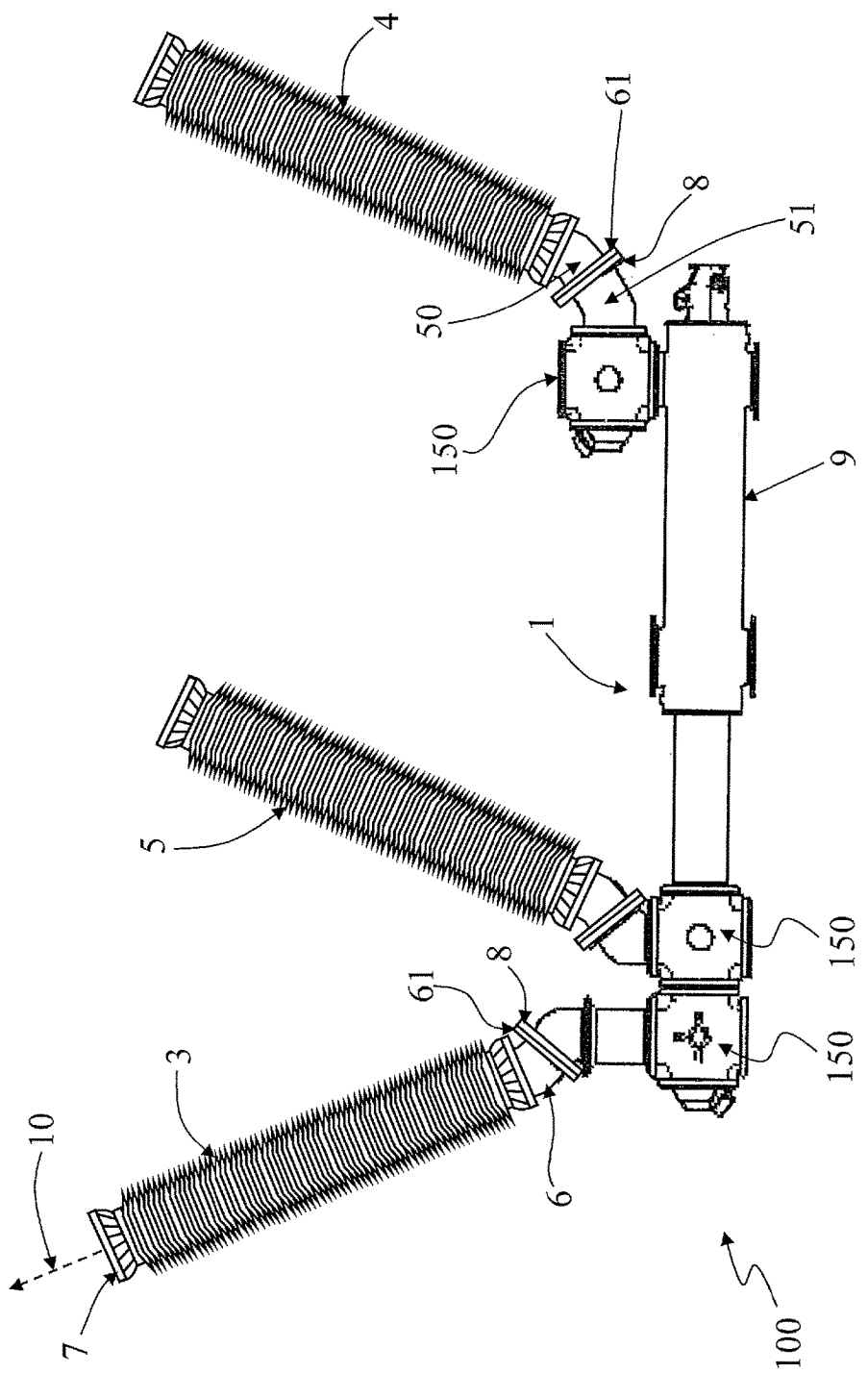
FIGS. 3-5 are views showing an exemplary three-pole electrical switchgear according to the present disclosure with their bushings in a first service position.
Figure 4:
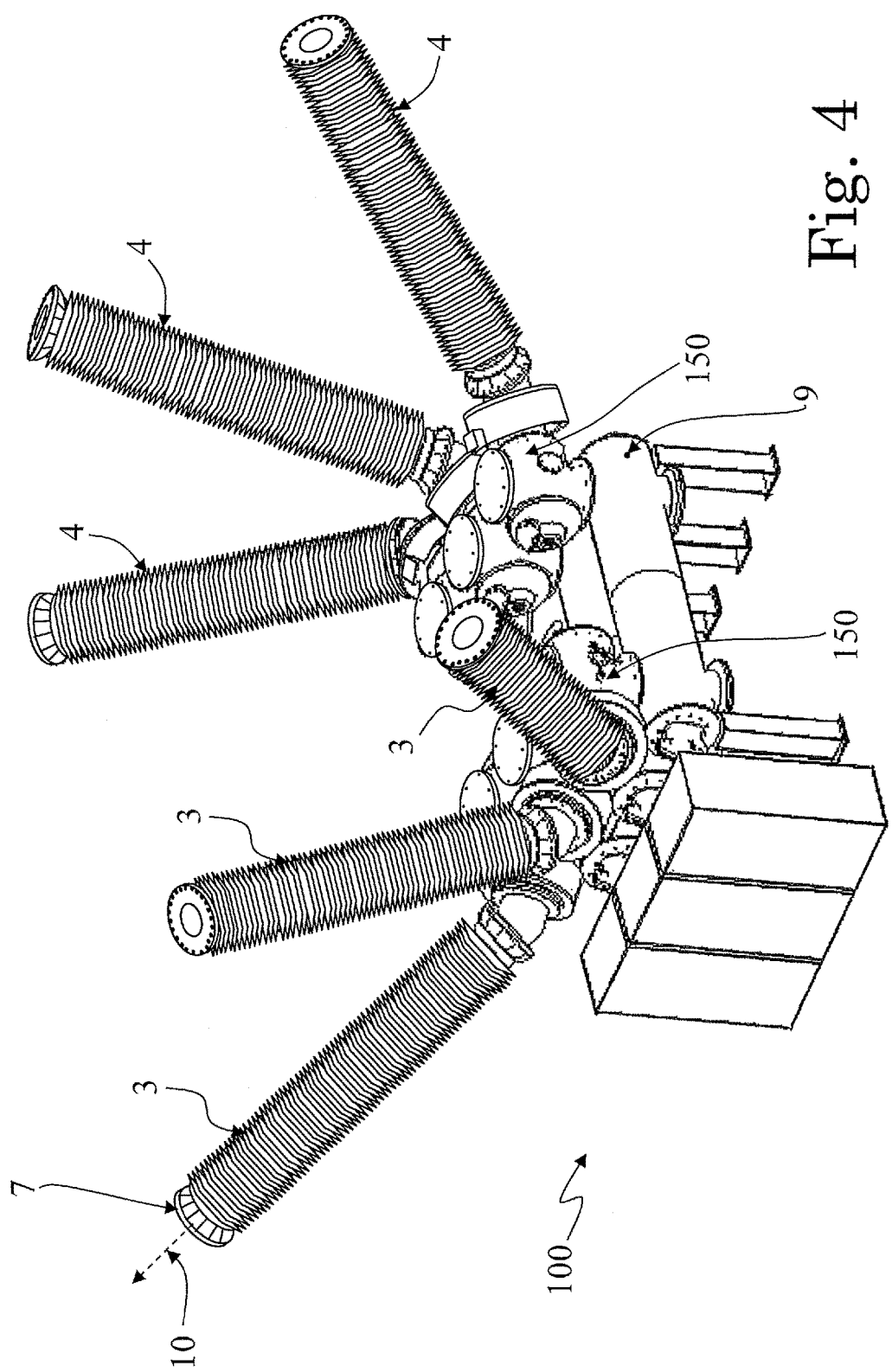
Figure 5:
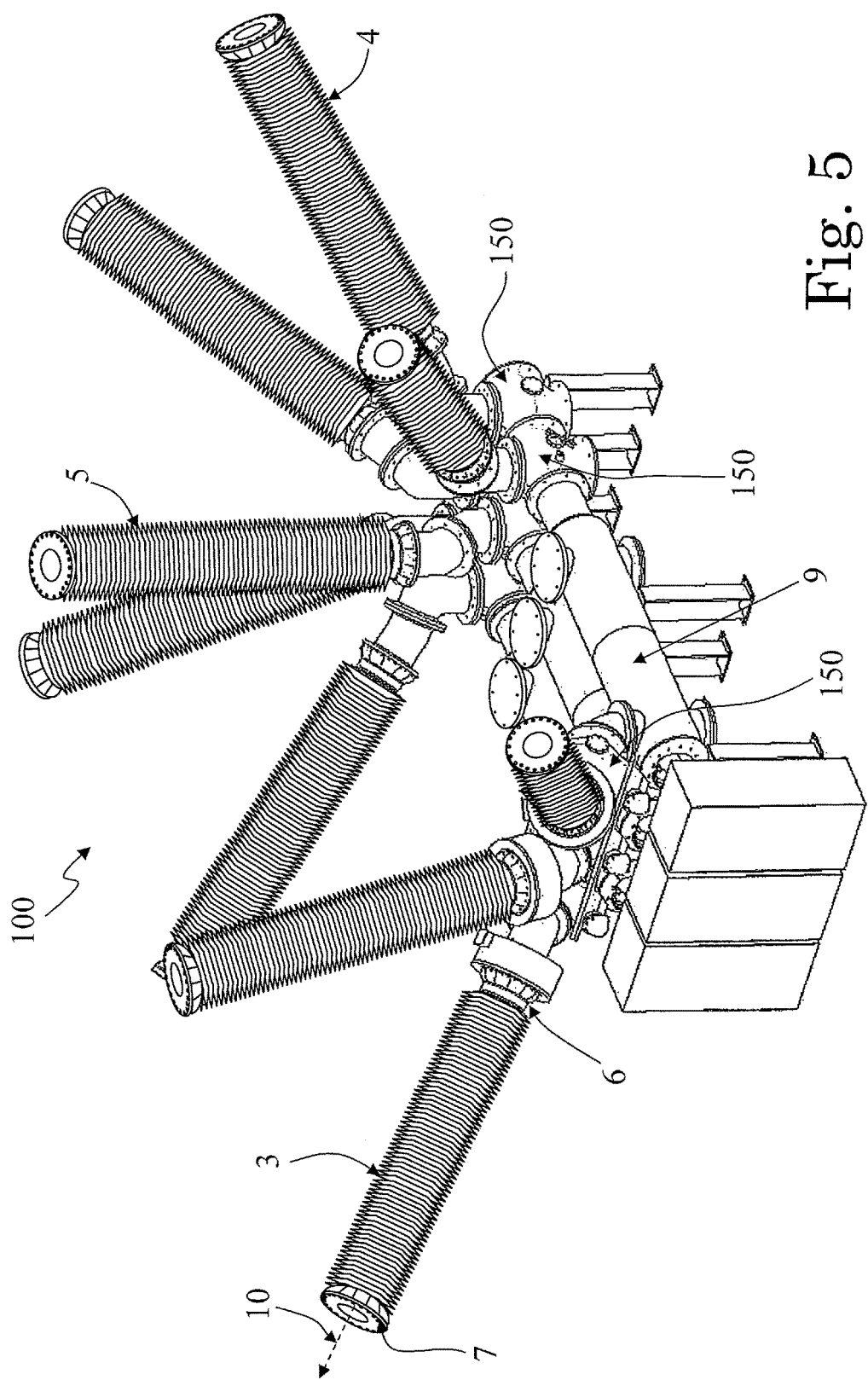
Figure 6:
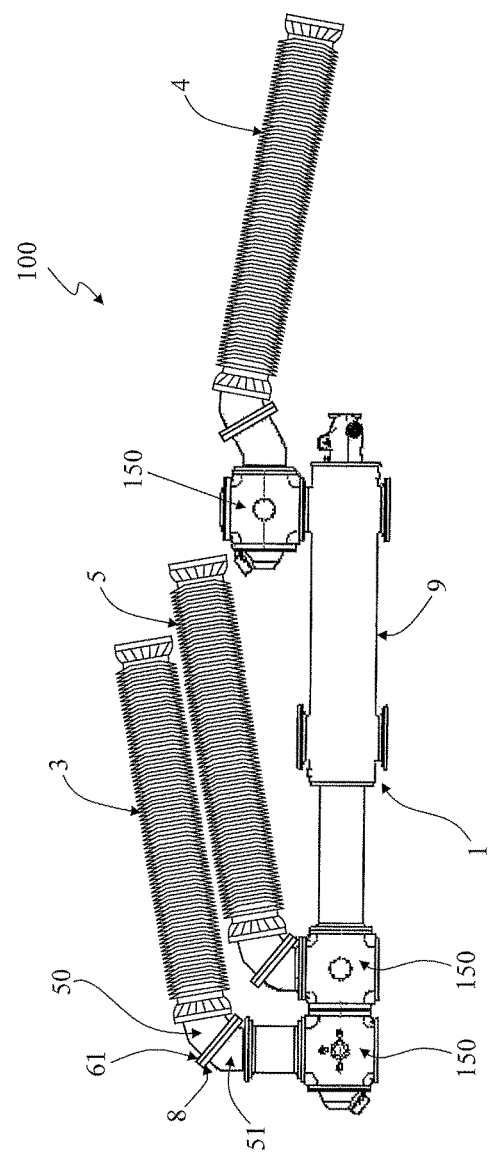
FIGS. 6-8 illustrate the electrical switchgear of FIGS. 3, 4 and 5, respectively, with their bushings in a second transport or shipping position.
Figure 7:
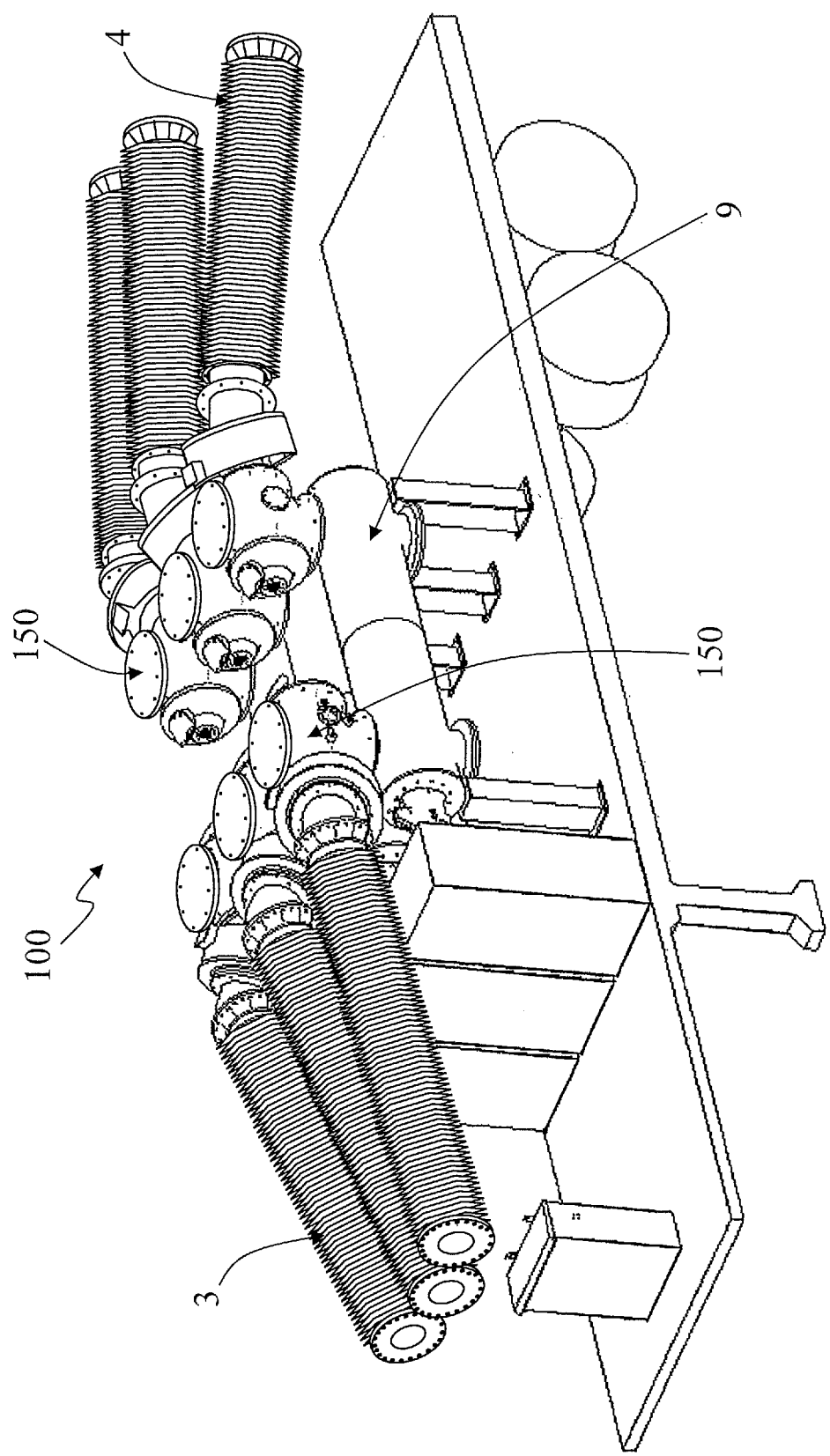

An exemplary typical electric switchgear 100 can include (for each pole) one or more bushings (also indicated for example as bushing insulators, or feedthrough, or the like) which are mechanically connected, to the casing 1, above it with respect to a placing surface, e.g. the ground; for instance, in the exemplary embodiment illustrated in FIGS. 4 and 7, for each pole there are two bushings 3 and 4, while in the exemplary embodiments of FIGS. 3 and 6, and 5 and 8, there are three bushing 3, 4, 5, connected to a casing 1.

For the sake of simplicity, in the following description reference will be made to just one of the bushings, e.g. the bushing 3 of one of the poles; it will be appreciated by those skilled in the art that what is described with reference to the bushing 3 can be applied likewise to any other bushing 4 and/or 5 of any pole.

Each bushing 3 (4, 5) can house a corresponding conductor 60, e.g. in the form of a rod, or a cable or a bar, which is suitable to allow an input/output electrical connection of the switchgear 100, and in particular of one or more of the electrical devices positioned inside the casing 1, with an external electrical circuit or device, e.g. a power line and/or other components, such as power transformers, loads, et cetera.

According to known solutions, each bushing 3 includes a body usually covered by external fins, which extends along a longitudinal axis 10 with a first lower end portion 6, provided with a connection flange or flange portion 61 which is meant to be operatively connected to the casing 1, e.g. to a flange or flange portion 8 of the casing itself, by means of fixing means, such as bolts 70. The bushing 3 has a second tip portion 7 which is spaced apart from the first lower end portion 6, and from which a terminal for allowing input/output electrical connection protrudes out.

At the base of each bushing there could be one or more additional pieces connected to the base portion of a bushing and moving solidly with it; in these cases, this additional piece constitutes the lower part of the bushing and its lower part encompasses the flange or flange portion 61 meant to be connected to the casing 1.

Likewise, the interface of the casing 1 forming the connection flange or flange portion 8 can be connected directly on the main body of the casing 1, e.g. there is not interposition of other connection pieces, as for example illustrated in FIG. 2, or there could be some additional connecting elements between the lower end portion 6 (or parts connected and solidly moving with it) and the main part of the casing 1. Such additional connecting elements can be considered as forming parts of the casing 1 as well.

For example, in some of the exemplary embodiments illustrated, two additional connecting elements 50, 51 are connected to each other and interposed between and operatively associated with the corresponding bushing 3 and the casing 1, respectively. In the embodiments illustrated such connection pieces 50, 51 are for example configured so as to form as a whole an elbow-shaped region between the bushing 3 and the casing 1. Clearly, these pieces may be differently shaped or connected, or there might be one piece only or more than two pieces.

For instance, any piece can be solidly connected with the casing 1 and therefore forms part of it, or it can be connected with the bushing thus forming part of and moving solidly with it; for example, the piece 50 can be connected solidly with a corresponding bushing and this piece 50 constitutes the lower part 6 of the bushing itself or in any case encompasses the flange or flange portion 61 meant to be mechanically coupled with the casing 1; in turn the piece 51 is solidly connected to the other elements of the casing 1 and encompasses the flange or flange portion 8.

Figure 8:
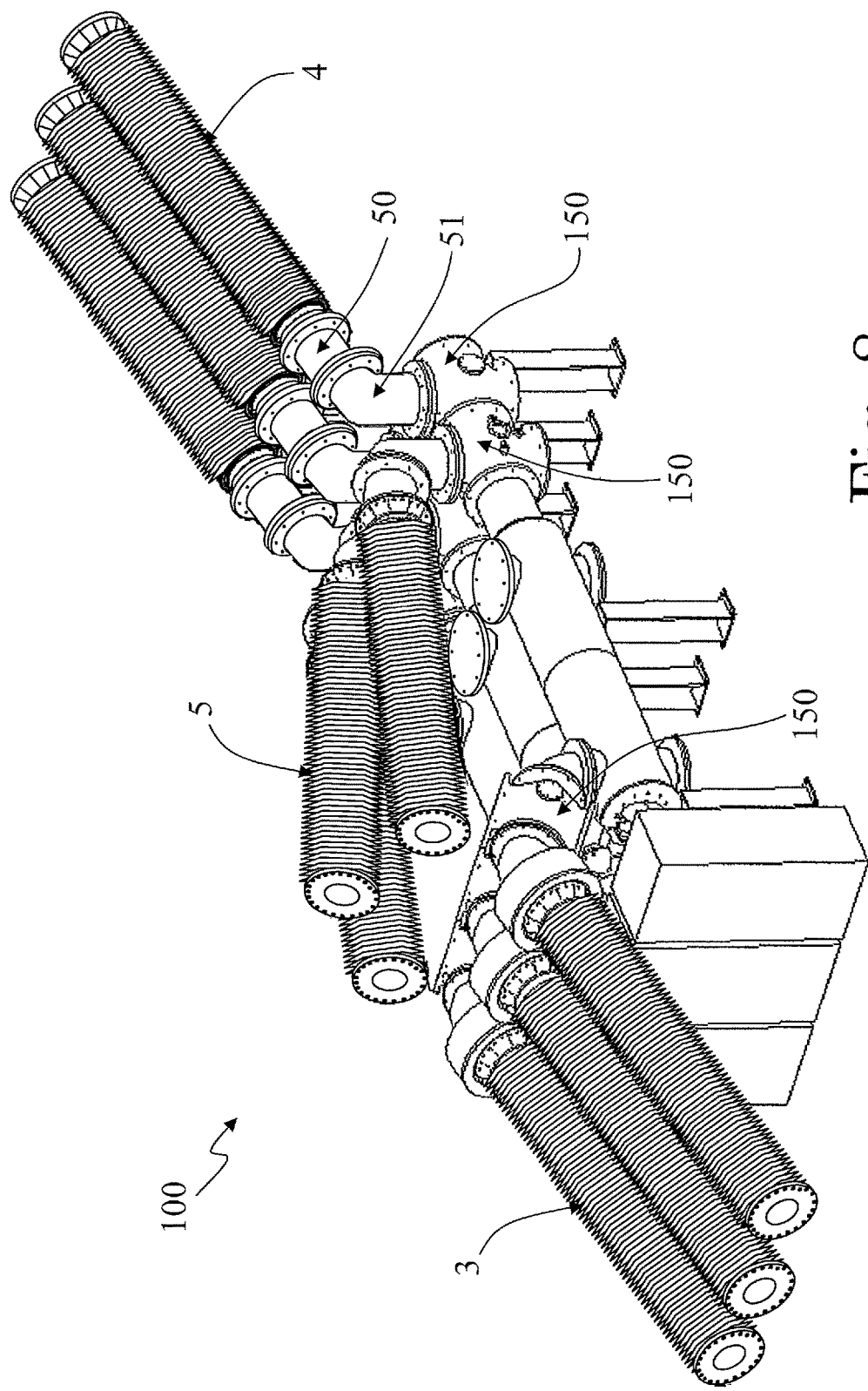
Figure 9:
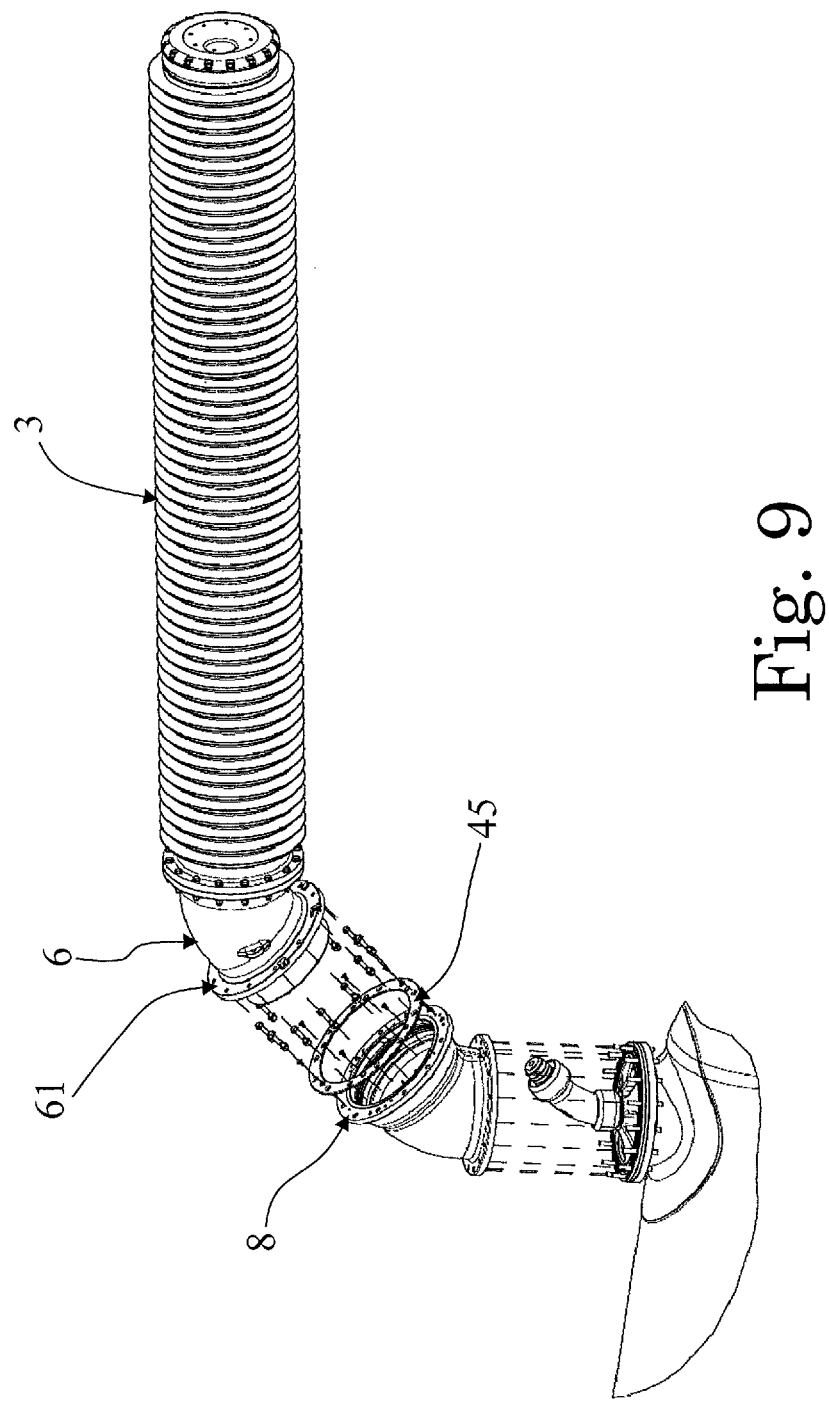
FIGS. 9-10 show in more details some components of an electric switchgear.

The actuating device 200 according to the present disclosure can include a gear mechanism which is suitable to be mounted at and outside the interface zone (e.g. at the interconnected flanges 61-8) where the bushing to be rotated, e.g. the bushing 3, is connected to the casing 1; for example, the illustrated gear mechanism can include a plurality of gear means 11, 12, 21, 24 which are operatively interconnected to each other and are arranged, once the gear mechanism is mounted on the associated switchgear 100, to rotate the corresponding bushing 3 (or 4, or 5) between a first service position wherein it is for example erected above the casing 1, as illustrated in FIGS. 3-5, and a second transport or shipping position wherein the at least one bushing 3 (or 4, or 5) is lowered towards the casing 1 from the first service position, as for example illustrated in FIGS. 6-8.

The actuating device 200 can include connection means 13, 20 which are arranged to keep the bushing 3 (or 4 or 5) operatively coupled to the casing 1 while the bushing 3 (or 4 or 5) is rotated between the first and second positions, in both directions.

For example, the gear means 11, 12, 21, 24 and the connections means 13, 20 of the actuating device 200 according to the present disclosure can be arranged to be coupled in a releasable manner at an outer surface of the interface zone where the bushing 3 (or 4 or 5) is connected to the casing 1.

For example, the gear mechanism used in the actuating device 200 is a multi-stage reduction gear mechanism, such as a two-stage reduction gear mechanism as it will be described in more details hereinafter.

Figure 11:
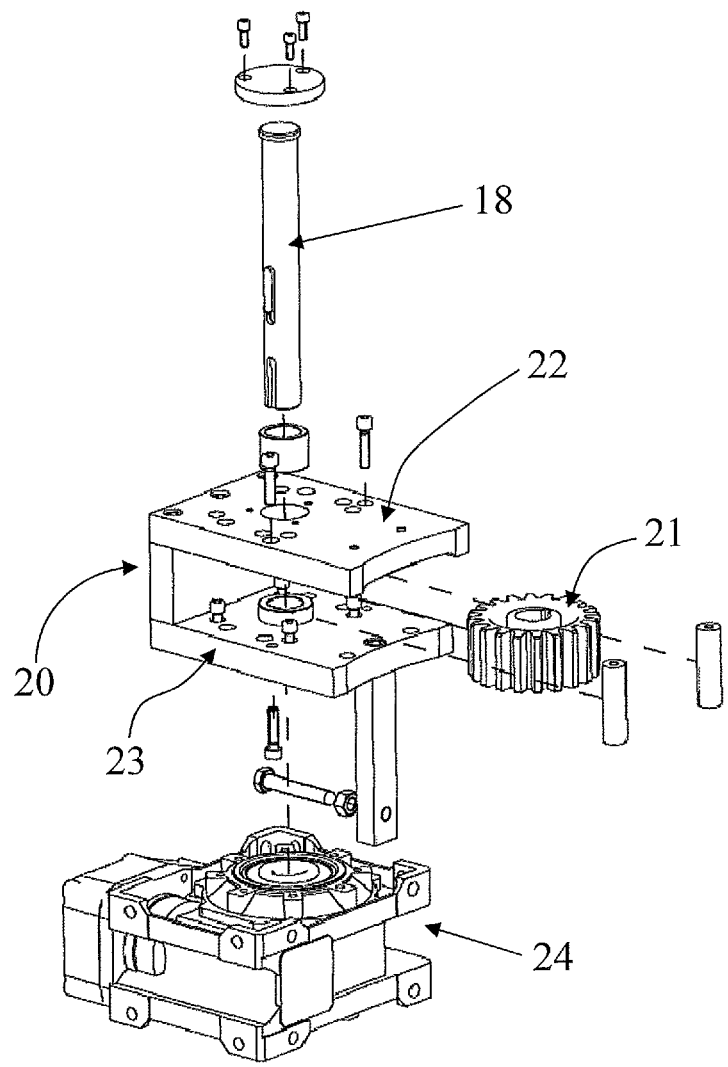
FIGS. 11-13 show in detail some exemplary components used in an actuating device according to the present disclosure.

The exemplary gear mechanism hereby described can include an endless-screw gear reducer 24 (or worm-gear reducer) illustrated in FIG. 11; such an endless-screw gear reducer 24 provides one stage of reduction, with a reduction rate which can range for example between 1:160 and 1:240. An example of a suitable endless-screw gear reducer 24 is the worm-gear type W R 75 marketed by company Bonfiglioli; however any type of gear reducer 24 available on the market can be used.

Figure 12:
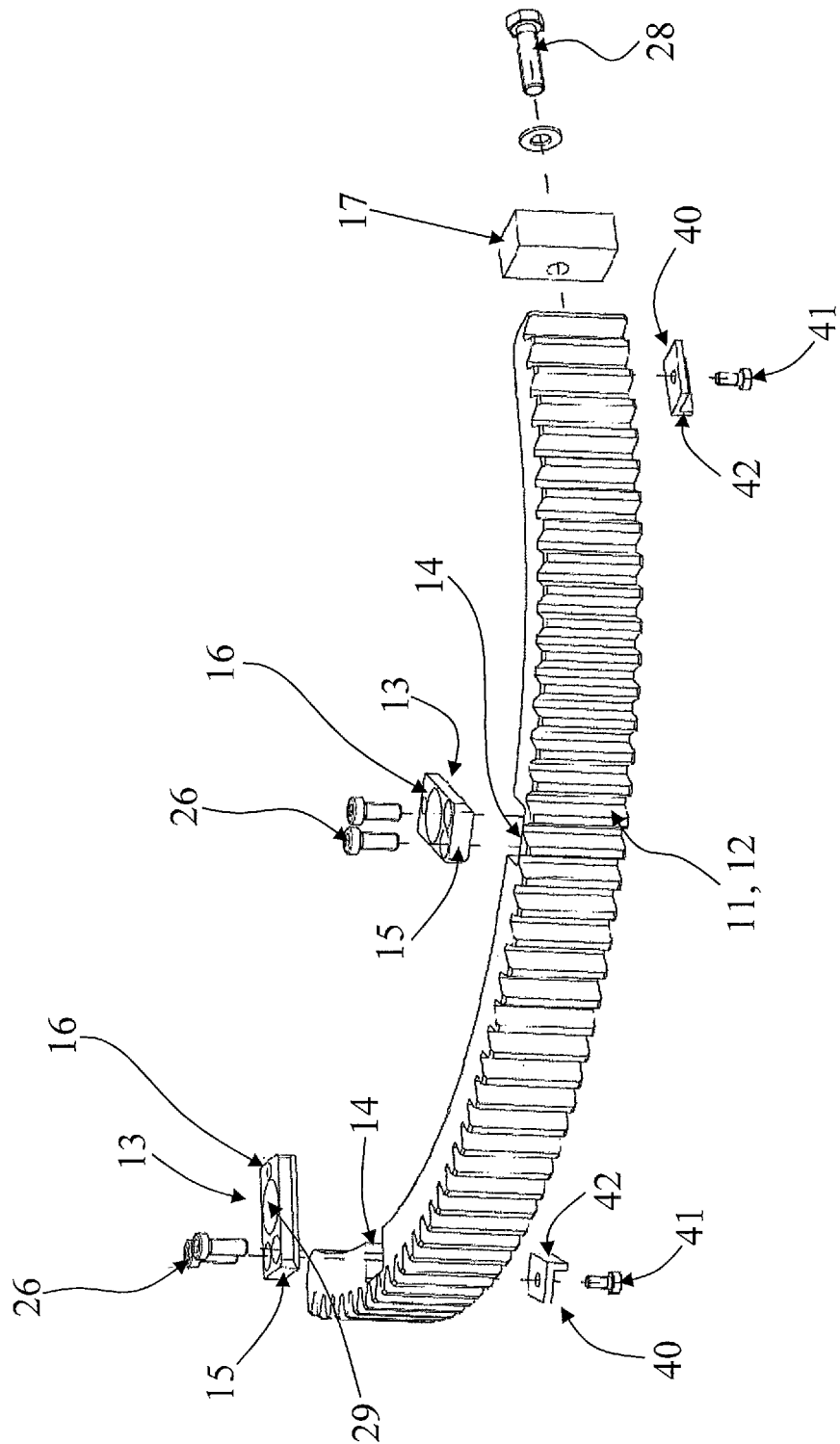
Figure 14:
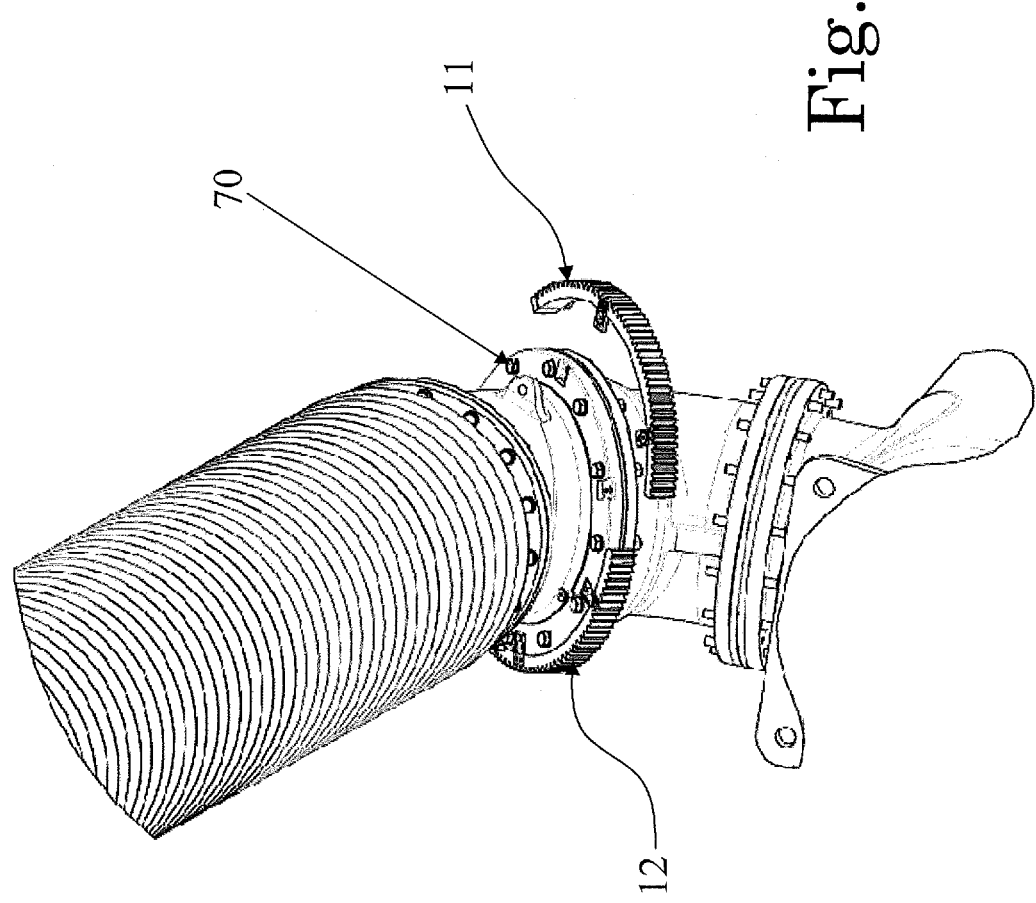
FIGS. 14-16 illustrate some mounting phases of the actuating device according to the present disclosure with an electric switchgear for example of the type illustrated in any of FIGS. 1-10.

As illustrated in FIG. 12, the exemplary gear mechanism can include at least one toothed ring-shaped sector 11 which is suitable to be positioned around the interface zone where the bushing 3 to be rotated (or part solidly movable with it) is connected to the casing 1 (or part solidly connected therewith) and to be temporarily fixed to the base portion 6, e.g. to the connection flange 61 of the bushing 3 itself through the connection means; for example, as illustrated in FIG. 14, the gear mechanism can include a first toothed ring-shaped sector 11 and a second toothed ring-shaped sector 12, e.g. substantially identical to each other. The two sectors 11 and 12 are suitable to be positioned, adjacent to each other, around the outer circumference of the interface zone where the bushing 3 is connected to the casing 1, and to be temporarily fixed to the base portion 6, e.g. to the flange 61 of the bushing 3 itself through the connection means.

In FIG. 11, for the sake of illustration the various elements depicted are shown in an exploded view; their mutual assembly is readily available to those skilled in the art and therefore need not be described herein in detail.

Further, as illustrated in FIG. 11, the gear mechanism can include a gear wheel 21 which is mechanically connected to the endless-screw gear reducer 24, for example through the coupling shaft 18; the gear wheel 21 is arranged to engage with one of the first and second toothed ring-shaped sectors 11, 12, and this engagement provides another reduction stage. For example, the toothed ring-shaped sectors 11, 12 and the associated gear wheel 21 are adapted to provide a reduction rate which can range for example between 1:3 and 1:10.

As illustrated in FIG. 12, each of the first and second toothed ring-shaped sectors 11, 12 can include one or more grooves or seats 14, which are open towards the side opposite to that of the toothed surface; in turn, the connection means includes a plurality of mounting blocks 13.

Each mounting block 13 has: one portion 15 which is inserted into a corresponding groove 14 of one of the ring-shaped sectors 11, 12 and is connected thereto for example by means of screws 26; and a second portion 16 which is suitable to be connected onto the base portion 6, namely onto the flange 61 of the bushing 3, through additional screws 26.

Further, as illustrated in FIG. 12, there is also provided at least one end-stroke block 17 which is connected, e.g. by means of a screw 28, at one end of one of the first or second ring-shaped sectors 11, 12. Such end-stroke block 17 represents a stopping element for the movement of a sector 11 or 12 relative to the gear wheel 21 when rotating a bushing 3. Clearly there could be provided one end-stroke block 17 for each toothed ring-shaped sector 11, 12.

Figure 15:
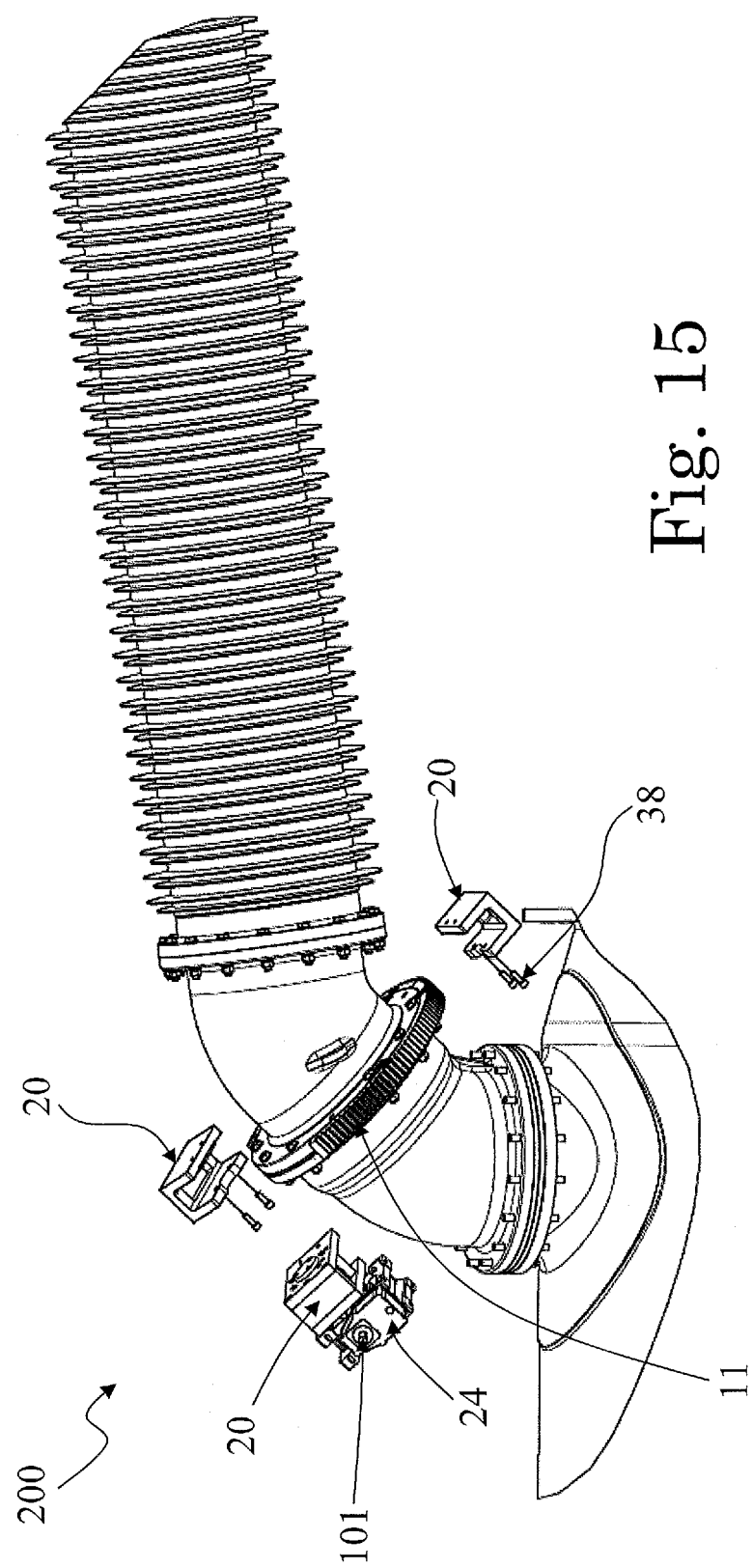
Figure 16:
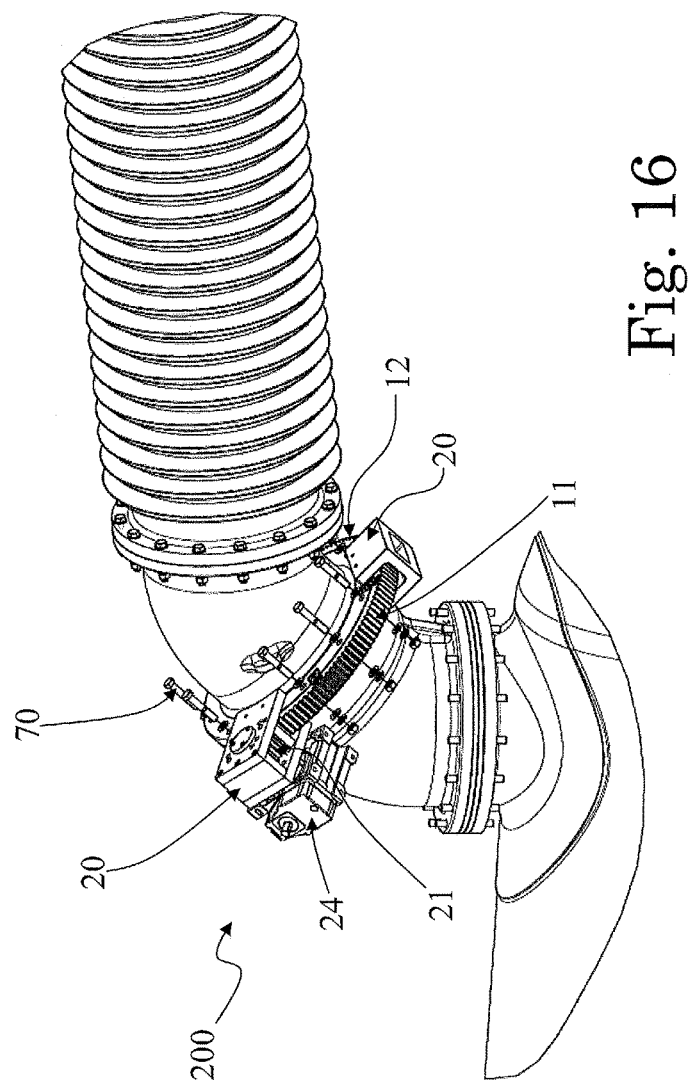

The connection means can include a plurality of C- or U-shaped clamping elements 20, e.g. three as illustrated in FIG. 15.

Figure 13:
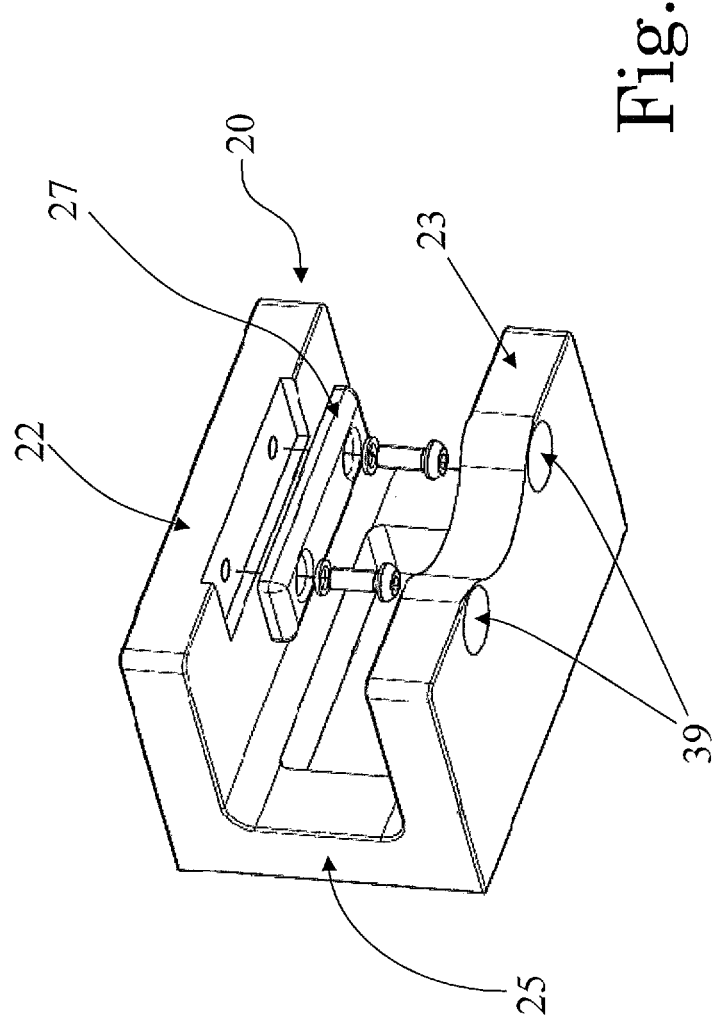

One example of clamping element 20 is illustrated in FIG. 13; as illustrated, each clamping element 20 has one side 23 suitable to be temporarily fixed onto a portion of the casing 1, e.g. the flange 8 facing the flange 61 at the base portion 6 of the bushing 3, and a second side 22 which is parallel to the first side 23 and is connected therewith by means of a third side 25; for example, when the clamping elements 20 are mounted, the second side 22 is suitable to face the base portion 6 of a bushing, and in particular the upper surface of the flange 61, while a portion of the first or second ring-shaped sectors 11 or 12 is inserted between and movable relative to the first and second sides 22, 23. In the exemplary embodiment illustrated, a layer of anti-friction material, e.g. a PTFE layer 27, can be placed, e.g. screwed, on the inner part of the side 22, so as to reduce friction with the flange 61.

For example, as illustrated in FIGS. 15 and 11, one of the C- or U-shaped clamping elements 20 is mechanically connected to the endless-screw gear reducer 24 and accommodates inside its body, between the two parallel sides 22, 23, the gear wheel 21.

The exemplary actuating device 200 illustrated can include one or more support blocks 40, e.g. L-shaped, which are connected each to the first or second ring-shaped sectors 11, 12, e.g. by means of screws 41; each support block 40 has one surface 42 suitable to bear against a portion of the casing 1, e.g. the flange 8, at the interface zone where the bushing 3 to be rotated is connected to the casing 1.

In practice, when the switchgear 100 is assembled, for each pole, all bushings 3, 4, 5 are mechanically connected to the casing 1, and for example, the flange portions 61 at the base part 6 of each bushing 3, 4, 5 are connected, e.g. through the bolts 70, each to a corresponding flange 8 of the casing 1.

In such a condition, the bushings 3, 4, 5 are all in the working or service position i.e. they are erected above the casing 1, as illustrated for example in FIGS. 3-5 (tip portion 7 is spaced apart above the main portion of casing 1).

If the switchgear has to be shipped, e.g. by means of a truck, and if its size, especially its height, exceeds the allowed size, at each needed bushing (depending on the specific needs), e.g. the bushing 3, an operator removes some of the bolts 70, e.g. a number equal to that of the clamping elements 20 to be used. Then, as illustrated in FIG. 14, the two toothed ring-shaped sectors 11, 12, with the end-stroke block 17, the mounting blocks 13 and the support blocks 40 connected therewith, can be connected to the upper surface of the flange 61; in practice, a screw 26 passes through a hole 29 provided on a mounting block 13 and engages with a corresponding hole provided on the flange 61 itself.

Then the clamping elements 20 are put in place. More in details, the C- or U-shaped clamping elements are temporarily connected to the lower surface of the flange 8 of the casing 1; in particular, according to the exemplary embodiment illustrated in FIG. 15, screws 38 pass through corresponding holes 39 provided on each clamping element 20 and engage each with a corresponding hole provided on the flange 8.

In this position, the side 22 of each clamping element 20 faces and is very close to or quasi-in surface contact with the corresponding upper surface of the flange 61; in this way each clamping element 20 embraces, at the interface zone, a portion formed by the mutually connected flanges 8 and 61, while a part of each sector 11 or 12 passes within the body of each clamping element 20 and is spaced from the sides 22, 23, 25 and also from the outer surface of the interface zone formed by the two connected flanges 8-61. Clearly, thanks to the easy solution adopted and previously described, once one of the clamping elements 20 is positioned, also the gear reducer 24 connected therewith is put directly in place and the gear wheel 21 housed within the body of such clamping element 20 engages with the teeth of one of the toothed sector 11 or 12.

In this position, all the remaining bolts 70 can be removed since the clamping elements 20 allow to keep the bushing 3 safely coupled with the casing 1.

At this point, rotation of the bushing 3 can be carried out by coupling an actuator with the gear reducer 24 at the mechanical interface 101. For example, an automatic screwdriver or a commercial motor can be used; through the gear mechanism, the energy provided by the actuator allows to rotate the bushing 3 which is drawn by the ring sector 11 or 12 until it reaches the shipping or transport position as shown for example in FIGS. 6-8. During the rotation, the surfaces 42 of the support blocks 40 bear against a surface of the flange 8 thus transferring to it the radial stresses exerted on the ring-shaped sectors 11, 12 and contrasting their possible deformation. In addition, the use of the multi-stage reduction mechanism allows reducing the force needed from the actuator, and for example if a motor is used, it is possible to use a motor of size reduced.

Figure 10:
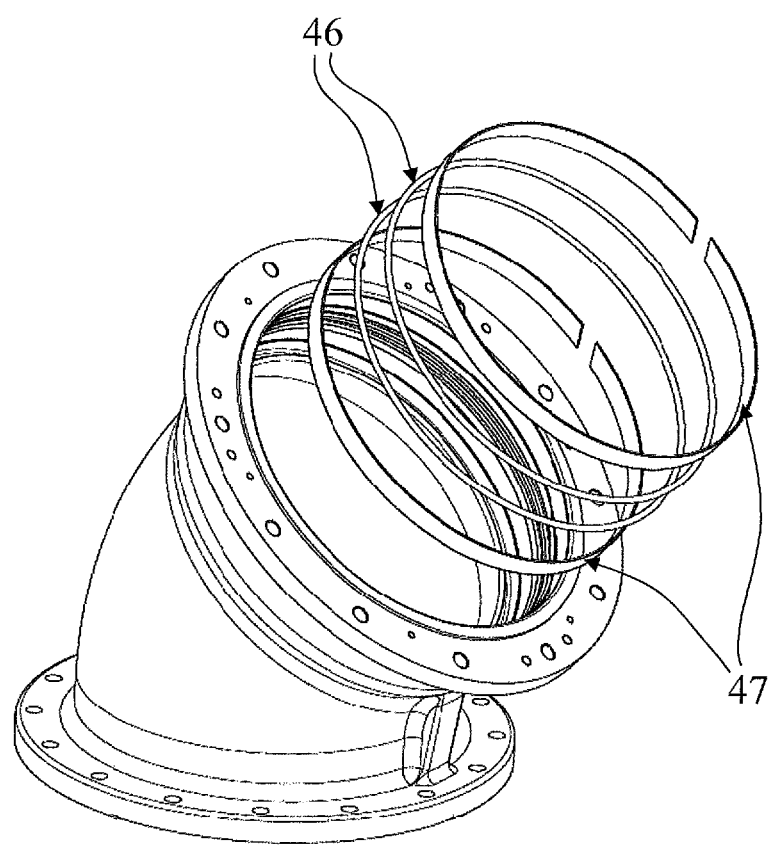

In order to further ease the rotation of a bushing 3, 4, 5 with respect to the casing 1, a washer 45, e.g. a ring made of steel or aluminum and coated with PTFE, can be positioned between the connection flange 61 solidly rotating with the bushing 3 and the flange 8 solidly connected to the casing 1. Such washer 45 can be connected for instance to the flange 8 itself at the surface facing the flange 61. Further, inside the casing 1, e.g. on the inner surface of a piece, for instance the piece 50 or 51, there could be provided O-rings gaskets 46, e.g. two, and low-friction back-up strips 47, e.g. two as for example illustrated in FIG. 10. Such strips 47 can be made for example of composite material and are capable of withstanding high radial loads, thus ensuring that the O-rings work in a proper way and prevent any leakage of insulating fluid, e.g. gas, which may be present inside the casing 1.

Once the rotation is concluded, all bolts 70 except those whose position is occupied by the clamping element 20 can be fixed again. Then the clamping elements 20 and the toothed ring-shaped sectors 11, 12 can be removed and the last bolts 70 can be fixed, thus completing the re-connection between the flanges 8 and 61.

What is above described for the bushing 3 can, for example, be applied in the same way for one or more of the other bushings of any pole.

In this position the switchgear is ready for shipping; as illustrated in FIGS. 6-8, the tip portion 7 of the bushing 3 is lowered towards the main portion of the casing 1 thus resulting in an overall size, and in particular a total height (measured in a vertical plan parallel to that of the drawing sheets) which is substantially reduced with respect to the first service position.

Once the switchgear 100 is at the installation site, the operation can be substantially reversed with the same elements, bringing the bushing(s) 3 and/or 4 and/or 5 back to the first service position where they are erected above the casing 1 as for example illustrated in FIGS. 3-5.

In practice, it has been found that the actuating device according to the present disclosure allows facing the issue of shipment previously mentioned, since it makes possible to at least temporarily reduce the size and in particular the height of the switchgear while keeping the parts still coupled to each other. This result is achieved according to a solution quite simple, flexible and easy to be implemented or modified to be tailored to different applications. For example, the various components of the actuating device 200 are all positioned outside the switchgear and can be easily mounted/disassembled, and are directly accessible to operators. Further, to the extent possible and/or desired, the actuating device 200 can be kept mounted with the associated switchgear 100 as a part of the switchgear itself.

Moreover, the bushings can be all rotated and lowered in the same direction (FIG. 6), or in directions opposite to each other (FIG. 7), or some bushings are moved in a direction and some other bushings in the opposite direction (FIG. 8).

The actuating device thus disclosed is susceptible of modifications and variations, all of which are within the scope of the inventive concept including any partial or full combination of the above described embodiments; all details may further be replaced with other technically equivalent elements. For example, it is possible to move a bushing together with the respective piece 150 (and also with all intermediary pieces there might be present in between) as a unique body relative to the casing 1, in which case the piece 150 can be considered as a piece operatively associated to and solidly moving with the respective bushing; or it is even possible to move together with a bushing (and again also with all intermediary pieces there might be present between the bushing and the casing 1) even a part of the main portion 9 of the casing 1 relative to the remaining portions of the casing 1 itself. There could be one single casing 1 housing all equipment of all poles, and on which all bushings of the various poles are mounted; the poles of the switchgear can be of any number.

The clamping elements 20 may be differently shaped and/or positioned, and/or any suitable number of them can be used.

The number, and/or shape, and/or mutual positioning of the elements constituting the casing 1, and/or of the interconnection elements 50, 51, may be suitably varied according to the specific application; for instance, one or more of the pieces 50, 51 can realized integrally with a bushing or the casing, namely the connection element 50 can be constituted for instance by the same lower end portion 6 of the bushing suitably shaped. Different movements of the bushing(s) other than rotation(s) can be realized.

In practice, the materials, so long as they are compatible with the specific use, as well as the individual components, may be any according to the requirements and the state of the art. For example, a bushing can be realized with a tube of composite material, e.g. fiberglass with silicon sheds molded there on, or it may be realized by means of porcelain with fins made of glass, et cetera.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An actuating device configured for connection to an associated electric switchgear having a casing housing, one or more electrical devices and at least one bushing which is connected to the casing and houses a conductor suitable to allow the electrical connection to input to or output from the switchgear, the actuating device comprising:
    a gear mechanism configured to be mounted at and outside a zone where the at least one bushing is to be connected to the casing, wherein the gear mechanism includes a plurality of gear members which are operatively interconnected to each other and are arranged to move said at least one bushing between a first service position and a second transport position wherein it is lowered towards the casing from said first service position the second transport position being configured to ship the switchgear to an installation site; and
    connection means which are configured and arranged to keep the at least one bushing operatively coupled to said casing while moving it between said first service position and second transport position,
    wherein the at least one bushing and casing are not separated from each other during shipment to the installation site, the at least one bushing being erected above the casing at the installation site from the second transport position to the first service position, the at least one bushing and casing remaining coupled together as the at least one bushing moves from the second transport position to the first service position at the installation site.

2. An actuating device according to claim 1, wherein said gear mechanism is a multi-stage reduction gear mechanism.

3. An actuating device according to claim 1, wherein said gear members and said connections means are arranged to be coupled in a releasable manner at an outer surface of said zone where said at least one bushing is to be connected to said casing.

4. An actuating device according to claim 1, wherein said gear mechanism comprises:
    an endless-screw gear reducer.

5. An actuating device according to claim 4, wherein said gear mechanism comprises:
    at least one toothed ring-shaped sector which is configured to be positioned around said zone where said at least one bushing is to be connected to said casing and to be temporarily fixed to a base portion of said at least one bushing through said connection means.

6. An actuating device according to claim 5, wherein said gear mechanism comprises:
    a first toothed ring-shaped sector and a second toothed ring-shaped sector which are configured to be positioned around said zone where said at least one bushing is to be connected to said casing, and to be temporarily fixed to a portion solidly moving with said at least one bushing through said connection means.

7. An actuating device according to claim 6, wherein said gear mechanism comprises:
    a gear wheel which is mechanically connected to said endless-screw gear reducer and is arranged to engage with one of said first and second toothed ring-shaped sectors.

8. An actuating device according to claim 7, wherein said connection means comprise:
    a plurality of C- or U-shaped clamping elements, each having one side configured to be temporarily fixed onto a portion of said casing devised to be connected to a flange portion solidly moving with said at least one bushing, and a second side which is parallel and connected to the first side by means of a third side, said second side being suitable to face said flange portion solidly moving with said at least one bushing, and wherein a portion of a corresponding first or second ring-shaped sector is inserted between and movable relative to said first and second sides.

9. An actuating device according to claim 8, wherein one of said C- or U-shaped clamping elements is mechanically connected to said endless-screw gear reducer and accommodates inside it said gear wheel.

10. An actuating device according to claim 6, wherein each of said first and second toothed ring-shaped sectors comprises:
    one or more grooves, and wherein said connection means comprise a plurality of mounting blocks, each mounting block having one portion which is inserted into a corresponding groove of one of the ring-shaped sectors and is connected thereto, and a second portion which is suitable to be connected onto the base portion solidly moving with said at least one bushing.

11. An actuating device according to claim 6, comprising:
    at least one end-stroke block which is connected at one end of one of the first or second ring-shaped sectors.

12. An actuating device according to claim 6, comprising:
    one or more support blocks which are connected each to the first or second ring-shaped sectors and have one surface configured to bear against a portion of said casing at said zone where said at least one bushing is to be connected to said casing.

13. An electric switchgear comprising:
    a casing one or more electrical devices;
    at least one bushing which is operatively connected to said casing, said at least one bushing housing a conductor suitable to allow an electrical connection in input to or output from the switchgear itself; and
    the actuating device according to claim 1.

14. An electric switchgear according to claim 13, wherein said gear mechanism comprises:
    an endless-screw gear reducer.

15. An electric switchgear according to claim 14, wherein said gear mechanism comprises:
    at least one toothed ring-shaped sector which is configured to be positioned around said zone where said at least one bushing is to be connected to said casing and to be temporarily fixed to a base portion of said at least one bushing through said connection means.

16. An electric switchgear according to claim 15, wherein said gear mechanism comprises:
    a first toothed ring-shaped sector and a second toothed ring-shaped sector which are configured to be positioned around said zone where said at least one bushing is to be connected to said casing, and to be temporarily fixed to a portion solidly moving with said at least one bushing through said connection means.

17. An electric switchgear according to claim 16, wherein said gear mechanism comprises:
   a gear wheel which is mechanically connected to said endless-screw gear reducer and is arranged to engage with one of said first and second toothed ring-shaped sectors.

18. An electric switchgear according to claim 16, wherein each of said first and second toothed ring-shaped sectors comprises:
   one or more grooves, and wherein said connection means comprise a plurality of mounting blocks, each mounting block having one portion which is inserted into a corresponding groove of one of the ring-shaped sectors and is connected thereto, and a second portion which is suitable to be connected onto the base portion solidly moving with said at least one bushing.

19. An electric switchgear according to claim 17, wherein said connection means comprise:
   a plurality of C- or U-shaped clamping elements, each having one side configured to be temporarily fixed onto a portion of said casing devised to be connected to a flange portion solidly moving with said at least one bushing, and a second side which is parallel and connected to the first side by means of a third side, said second side being suitable to face said flange portion solidly moving with said at least one bushing, and wherein a portion of a corresponding first or second ring-shaped sector is inserted between and movable relative to said first and second sides.

20. An electric switchgear according to claim 16, wherein:
   at least one end-stroke block which is connected at one end of one of the first or second ring-shaped sectors.

21. An actuating device according to claim 1, wherein said gear mechanism comprises:
   at least one toothed ring-shaped sector which is configured to be positioned around said zone where said at least one bushing is to be connected to said casing, wherein the at least one toothed ring-shaped sector is temporarily connected to the electric switchgear and is releasable therefrom after moving the at least one bushing between the first service position and the second transport position.

22. An actuating device according to claim 21, wherein the electric switchgear is filled with gas and does not need to be re-conditioned or re-tested after moving the at least one bushing between the first service position and the second transport position.

* * * * *